United States Patent [19]

Schmidt

[11] Patent Number: 4,705,473
[45] Date of Patent: Nov. 10, 1987

[54] DUAL FEED BUSHING FOR MULTI-CAVITY INJECTION MOLDING

[75] Inventor: Harald H. Schmidt, Georgetown, Canada

[73] Assignee: Mold-Masters Limited, Georgetown, Canada

[21] Appl. No.: 927,068

[22] Filed: Nov. 5, 1986

[30] Foreign Application Priority Data

Oct. 30, 1986 [CA] Canada .................................. 521873

[51] Int. Cl.$^4$ ............................................. B29C 45/22
[52] U.S. Cl. ................................ 425/549; 264/328.15; 425/562; 425/563; 425/564; 425/566; 425/588
[58] Field of Search ............... 425/549, 562, 563, 564, 425/566, 573, 577, 588; 264/328.15

[56] References Cited

U.S. PATENT DOCUMENTS

| | | | |
|---|---|---|---|
| 4,026,518 | 5/1977 | Gellert | 425/566 |
| 4,053,271 | 10/1977 | Gellert | 425/526 |
| 4,433,969 | 2/1984 | Gellert | 425/549 |
| 4,443,177 | 4/1984 | Modur et al. | 425/549 |
| 4,446,360 | 5/1984 | Gellert | 219/421 |
| 4,511,528 | 4/1985 | Kudert et al. | 425/573 |
| 4,609,138 | 9/1986 | Harrison | 228/161 |

Primary Examiner—Jay H. Woo
Assistant Examiner—Timothy W. Heitbrink
Attorney, Agent, or Firm—Riches, McKenzie & Herbert

[57] ABSTRACT

This invention relates to an improved valve pin bushing for a multi-cavity, injection molding system. The valve pin bushing has a central bore through which the valve pin extends. The melt duct extends through the bushing to join an enlarged portion of the central bore around the valve pin. In the bushing according to the invention, the melt duct branches into two arms with smoothly curved bends which lead to opposite sides of the valve pin. This avoids the problem of streaking and slow melt flow on the opposite side of the valve pin.

3 Claims, 4 Drawing Figures

DUAL FEED BUSHING FOR MULTI-CAVITY INJECTION MOLDING

BACKGROUND OF THE INVENTION

This invention relates to injection molding and more particularly to a valve pin bushing which provides improved melt feed around each valve pin in a multi-cavity valve gated injection molding system.

It is well known to use a valve pin bushing which provides a seal around a reciprocating valve pin and also has a melt duct which forms part of the melt passage leading to the gate. An early example of this is shown in U.S. Pat. No. 4,026,518 to Gellert entitled "Bushing Seal for Valve-Gated Injection Mold" which issued May 31, 1977. More recently, it has also become well known to use valve pin bushings in multi-cavity injection molding systems. As shown in U.S. Pat. No. 4,433,969 to Gellert entitled "Injection Molding Valve Pin Bushing and Method" which issued Feb. 28, 1984, each bushing is located between the manifold and a respective heated nozzle with a collar portion extending into an opening in the manifold. Each bushing has an outer flanged portion which abuts against the surrounding cavity plate to laterally locate the valve pin bushing, while sufficient clearance is provided through the opening in the manifold to allow for thermal expansion of the manifold. A melt duct extends diagonally through each bushing to join an enlarged portion of the central bore through which the valve pin extends. While this previous arrangement is suitable for many applications, when molding some materials such as white polyvinyl chloride the pattern of flow of the melt from the diagonal melt duct around the valve pin creates discoloured streaks where the flow joins again on the other side. This also delays the elimination of the previous coloured melt on colour changes because of slower melt flow on the opposite side of the valve pin.

SUMMARY OF THE INVENTION

Accordingly, it is an object of the present invention to at least partially overcome these disadvantages by providing a valve pin bushing in which the melt flow is directed to opposite sides of the valve pin.

To this end, in one of its aspects, the invention provides a multi-cavity valve gated injection molding system, comprising a manifold extending between a mold back plate and a plurality of spaced heated nozzles seated in a cavity plate, an elongated valve pin having a driven end and a tip end mounted in a central bore in each nozzle, the driven end of the valve pin being operatively connected to valve pin actuating mechanism mounted in the mold back plate whereby the valve pin is reciprocated between a retracted open position and a closed position wherein the tip end of the valve pin is seated in a gate extending through the cavity plate to a cavity, and a melt passage which branches from a common inlet and extends through the manifold connecting to the transverse bore and around the valve pin in the central bore of each nozzle to convey pressurized melt from a matching machine to each gate, the improvement wherein the melt passage extends through a valve pin bushing having a main body portion located between the manifold and each heated nozzle, the main body portion of each bushing being fixed to the respective nozzle and having first and second opposed surfaces and an outer periphery, a portion of the first surface abutting against the manifold, at least a portion of the second surface abutting against the respective nozzle and a sufficient portion of the outer periphery abutting the surrounding cavity plate to laterally locate the bushing, the main body portion having a valve pin bore extending therethrough from the first surface to the second surface, the valve pin bore having a first portion extending from the first surface and a second aligned portion extending from the second surface to join the first portion, the first portion of the valve pin bore having a substantially uniform diameter to snugly receive the valve pin therethrough, the second portion of the valve pin bore having a larger diameter than the first portion and extending in alignment to connect to the central bore of the nozzle, the main body portion of the valve pin bushing having a melt duct which forms a portion of the melt passage, the melt duct extending from the first surface of the first main body portion to the join between the first and second portions of the valve pin bore, the melt duct branching into two arms with bends which are smoothly curved to connect to the valve pin bore on opposite sides thereof.

Further objects and advantages of the invention will appear from the following description taken together with the accompanying drawings.

DETAILED DESCRIPTION OF THE DRAWINGS

Figure 1:
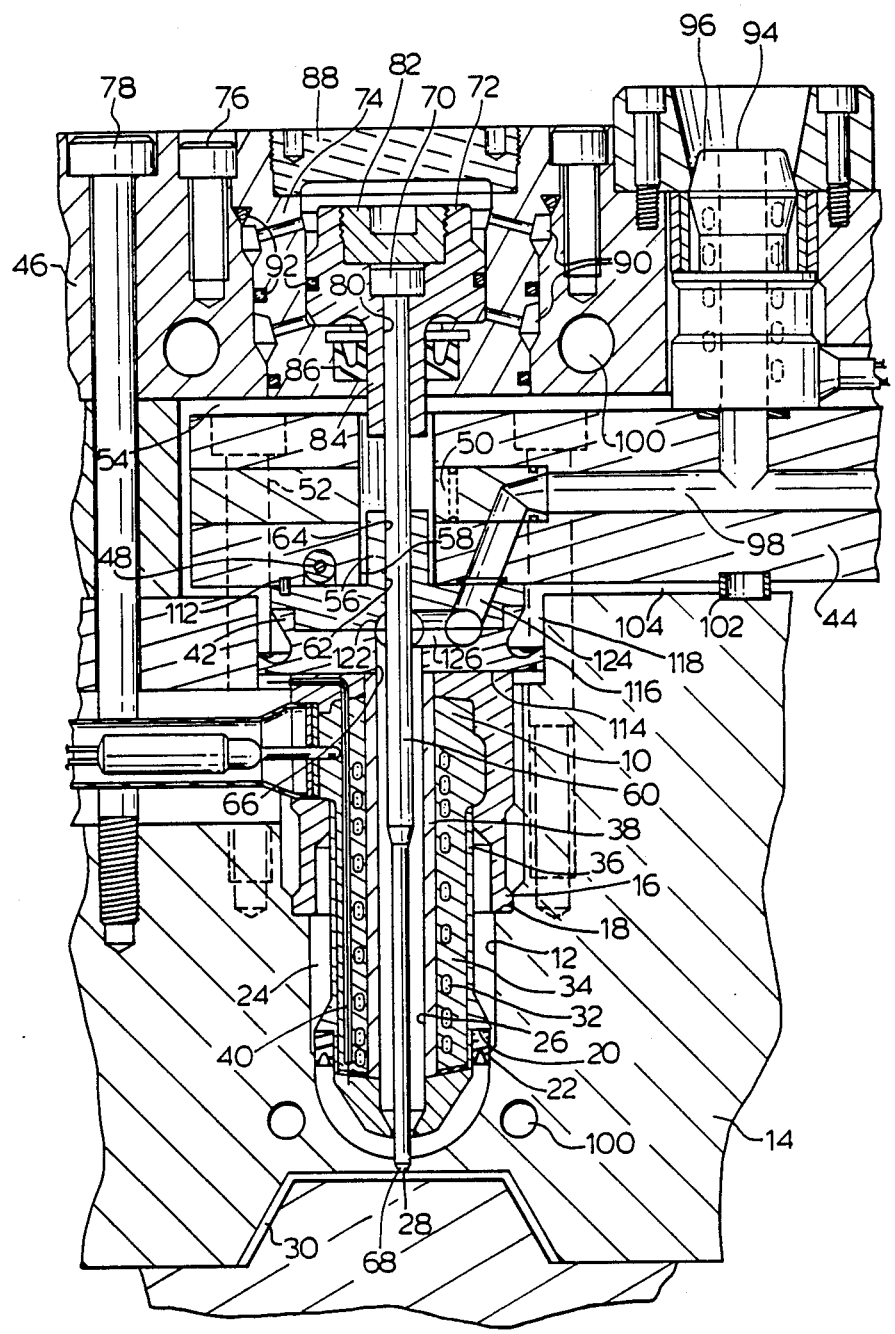
FIG. 1 is a sectional view of a portion of a multi-cavity valve gated injection molding system having valve pin bushing according to a preferred embodiment of the invention.

Reference is first made to FIG. 1 which shows a portion of a multi-cavity valve gated injection molding system having a number of heated nozzles 10 seated in a well 12 in a cavity plate 14. Each nozzle 10 has a locating bushing portion 16 which is seated against a circumferential shoulder 18 to accurately locate it in place. In this embodiment, each nozzle 10 is also machined to provide a circumferential seat 20 against which a hollow cylindrical seal 22 is seated. The seal 22 has a V-shaped lower surface which bridges the air space 24 between the nozzle 10 and the cavity plate 14 to prevent pressurized melt from filling the entire air space 24 during use. As described in U.S. Pat. No. 4,053,271 to Gellert entitled "Valve-Gated Injection Molding Mechanism" which issued Oct. 11, 1977, this seal 22 is formed of an alloy of titanium to reduce heat loss. In the embodiment shown, the nozzles 10 are made by the method described in Gellert Canadian patent application Ser. No. 496,645 entitled "Manufacturing Method for Selected Gate Configuration Injection Molding Nozzles" filed Dec. 2, 1985. Each nozzle 10 has a central bore 26 aligned with a gate 28 through the cavity plate 14 to a respective cavity 30. A helical heating element 32 cast in a copper portion 34 between a stainless steel outer portion 36 and a stainless steel inner portion 38 which forms the central bore 26. A thermocouple 40 extends through the copper portion 34 to measure the operating temperature adjacent the forward end of the nozzle. The nozzles may also be made as described in U.S. Pat. No. 4,446,360 to Gellert entitled "Sprue Bushing Connector Assembly" which issued May 1, 1984.

As described in more detail below, a valve pin bushing 42 is secured to each heated nozzle 10. A portion of the heated manifold 44 extends between each bushing 42 and the mold back plate 46. The manifold 44 is made of steel with an electric heating element 48 and plugs 50 vacuum cast or brazed in as described in the applicant's U.S. Pat. No. 4,609,138 entitled "Method of Manufacturing Injection Molding Manifold with Plugs" which issued Sept. 2, 1986. Bolts 52 extend from the manifold 44 into the cavity plate 14 to secure the valve pin bushing 42 tightly between the manifold 44 and each nozzle 10 to prevent leakage. This holds the manifold 44 and the bushing 42 in place and provides an insulative air space 54 between the hot manifold 44 and the cooled mold back plate 46. In this embodiment, each valve pin bushing 42 has a cylindrical collar portion 56 which extends into an opening 58 in the manifold 44 with sufficient clearance to avoid interference as a result of lateral thermal expansion of the manifold 44.

An elongated valve pin 60 is located in the central bore 26 of each nozzle 10 and extends through the valve pin bushing 42. Each bushing 42 has a central bore 62 with a first portion 64 which snugly receives the valve pin 60 and an enlarged second portion 66 which is aligned with and the same size as the central bore 26 of the nozzle 10. Each valve pin 60 has a tapered tip end 68 and an enlarged driven end 70 which is engaged by hydraulic actuating mechanism seated in the mold back plate 46. The actuating mechanism includes a piston 72 which reciprocates in a cylinder 74 seated in the mold back plate 46. The cylinder 74 is fixed to the mold back plate 46 by bolts 76 and the mold back plate is held securely by bolts 78 which extend into the cavity plate 14. The valve pin 60 extends through a hole 80 in the piston 72 and is secured to it by a threaded plug 82 which screws into the piston 72 and also seals against leakage of the hydraulic fluid. The piston has an elongated neck portion 84 which extends into the opening 58 in the manifold 44, and a V-shaped high temperature seal 86 is seated in the cylinder 74 to prevent leakage of pressurized hydraulic fluid around it. The cylinder 74 has a threaded cap 88 which is larger in diameter than the piston 72 so that the piston 72 and valve pin 60 can be removed if necessary. Pressurized hydraulic fluid is supplied to the cylinder 74 on opposite sides of the piston 72 through ducts 90 from a controlled source (not shown) to reciprocate the piston according to a predetermined cycle. In the forward closed position the valve pin tip end 68 is sealed in the gate 28, while in the retracted open position the piston abuts against the cap 88. O-rings 92 are also provided to prevent leakage of the pressurized hydraulic fluid around the piston 72 and the cylinder 74.

Pressurized melt is introduced into the system from a molding machine (not shown) at the mouth 94 of a heated sprue bushing 96. The sprue bushing 96 is also made by the method described in Canadian patent application Ser. No. 496,645 referred to above. The melt flows to each gate 28 through a melt passage 98 which extends from the sprue bushing 96, branches out in the manifold 44, through the valve pin bushing 42 and through the central bore 62 of the nozzle 10 around the valve pin 60. As is well known, it is critical to successful operation of the system that the melt is maintained within a narrow temperature range as it flows through the melt passage 98. Thus, heating elements are provided in the sprue bushing 96, manifold 44, and each nozzle 10, as shown. Also, it is necessary to cool the mold back plate 46 and the cavity plate 14 and water is pumped through cooling conduits 100 for this purpose. In order to reduce heat loss, an air space 24 is provided between each hot nozzle 10 and the surrounding cooled cavity plate 14 as described above. Similarly, insulative air space 54 is provided between the hot manifold 44 and the cooled mold back plate 46. Locating ring 102 laterally locates the manifold 44 relative to the cavity plate 14 as well as provides a further insulative air space 104 between the hot manifold 44 and the cooled cavity plate 14.

Figure 2:
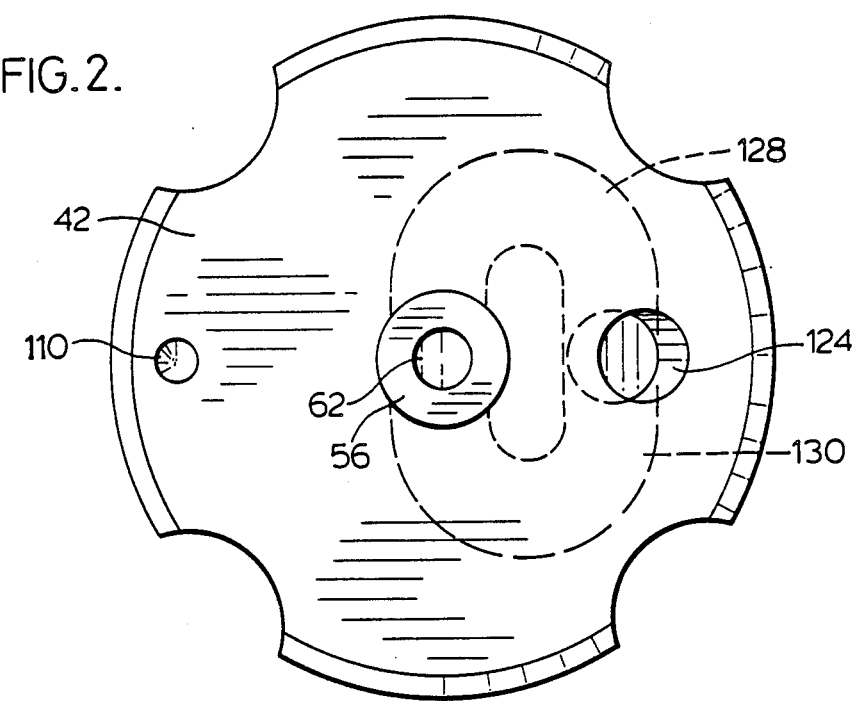
FIG. 2 is a plan view of the bushing seen in FIG. 3.
Figure 3:
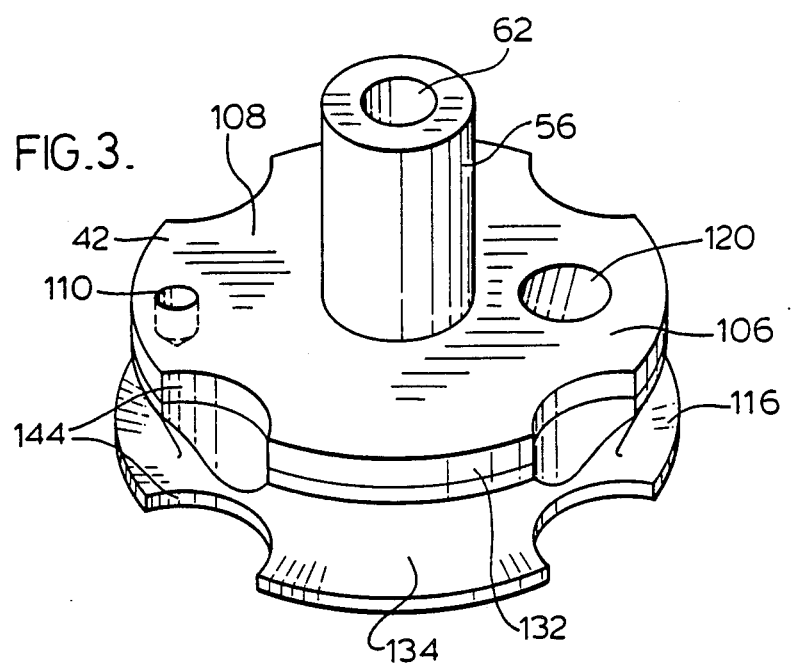
FIG. 3 is an isometric view of a finished bushing.
Figure 4:
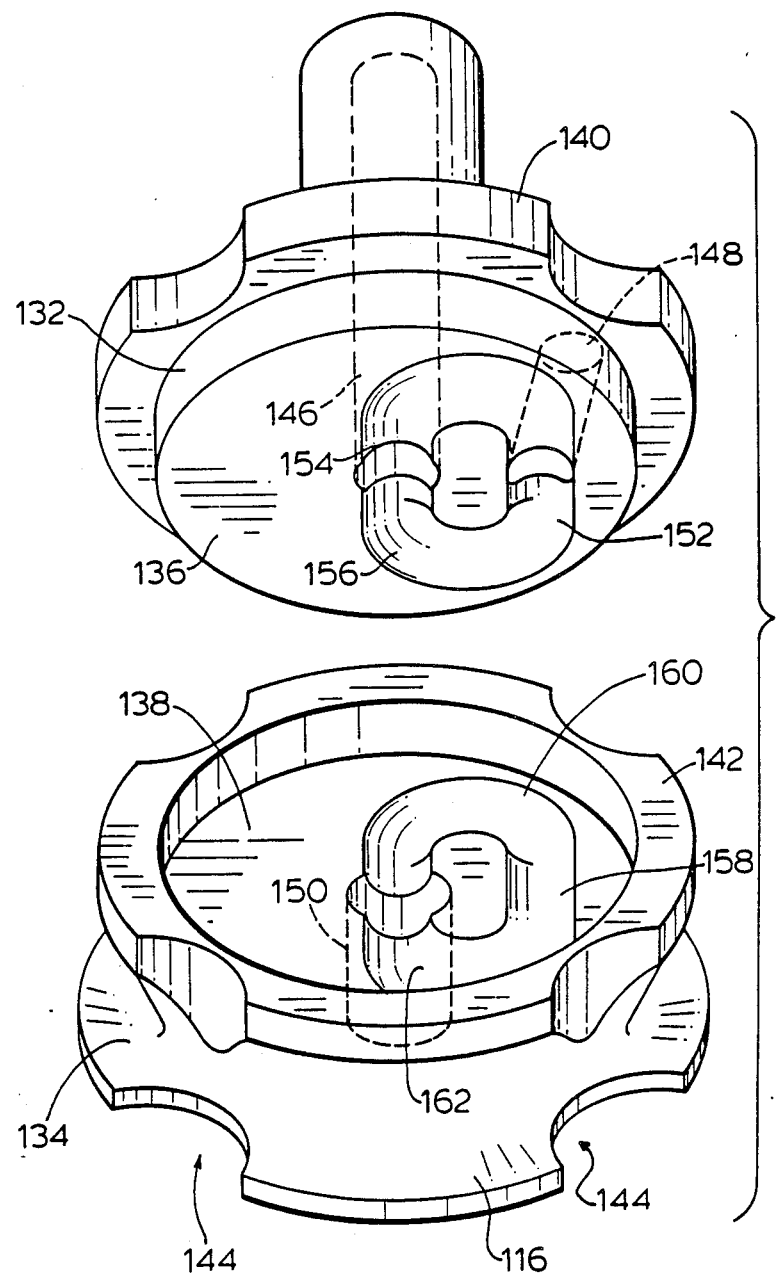
FIG. 4 is an exploded view showing assembly of the bushing in FIG. 2.

Referring to FIGS. 2-4, the improved valve pin bushing according to the invention and one method of manufacturing it will now be described. As seen in FIG. 3, the valve pin bushing 42 has a main body portion 106 with a first upper surface 108 from which the cylindrical collar portion 56 extends. The upper surface 108 also has a hole 110 to receive a small locating pin 112 to rotationally locate the generally circular bushing relative to the manifold 44. As seen in FIG. 1, each bushing 42 is secured tightly in the system by bolts 52 with a second lower surface 114 abutting against the nozzle 10 and the upper surface 108 abutting against the manifold 44. The collar portion 56 extends into the opening 58 in the manifold with enough clearance to provide for thermal expansion of the manifold. Each bushing 42 has a narrow flanged portion 116 which extends to abut against the surrounding cavity plate 14 to locate the bushing 42, while also maintaining an insulative air space 118 between the hot bushing and the cooled cavity plate. While the flanged portion 116 is shown of larger diameter than the rest of the bushing, the upper portion of the bushing could be made of a larger diameter if the mold were stepped to maintain the insulative air space 118 around it. As mentioned above, the central bore 62 extending through the bushing has a first smaller diameter portion 64 which snugly receives the reciprocating valve pin 60 and a larger diameter portion 66 which extends to the second surface 114 in alignment with the central bore 26 of the nozzle 10. Each valve pin bushing 42 also has a melt duct 120 which forms part of the melt passage 98 which conveys melt from the sprue bushing 96 to each gate 28. The melt duct 120 extends from the first surface 108 of the main body portion 106 of the bushing 42 to the join 122 between the first and second portions 64,66 of the valve pin bore 62. The melt duct 120 has a first diagonal portion 124 extending from the first surface 108 of the main body portion 106 and a second portion 126 which extends in a plane parallel to the first and second surfaces 108,114 of the main body portion 106 of the bushing 42. As can be seen in FIG. 2, the second portion 126 of the melt duct branches into two arms 128,130 which have smoothly curved bends and extend to the valve pin bore 62 on opposite sides of the valve pin 60. Thus, the melt arrives at the valve pin in two separate streams which avoid the problems described above which arise when the melt flows from only one side. It will, of course, be apparent that the melt duct 120 through each bushing 42 and, in fact, the melt passage 98 throughout must be made with all smooth bends and corners and no dead spots to avoid deterioration of the pressurized melt.

Reference is now made to FIG. 4 in describing a method of making valve pin bushings 42 having the unique melt duct 120 described above. First and second circular body portions 132,134 are machined of tool steel to a desired configurations. The lower surface 136 of the first upper portion 132 matches the upper surface 138 of the second lower portion. The first upper portion 132 has a flange 140 which sits on a rim 142 of the lower portion 134 to accurately locate them together. The lower portion 134 has the locating flanged portion 116 and scallops 144 are provided in the embodiment for clearance for retaining bolts 52. A first hole 146 is drilled centrally through the first body portion 132 to form the first portion 64 of the bore 62 which snugly receives the valve pin during use. In the embodiment described, the first body portion 132 has a cylindrical collar portion 56 extending from it and the hole 146 extends through it. While a method of manufacturing a valve pin bushing with a collar portion is described in U.S. Pat. No. 4,433,969 referred to above, this method is integrated into the present method as described below. A second hole 148 is drilled diagonally through the first body portion 132 to provide the first diagonal portion 124 of the melt duct 120. A hole 150 is drilled centrally through the second body portion 134 to form the enlarged second portion 66 of the valve pin bore 62. When assembled, this hole 150 is in alignment with the first hole 146 in the first body portion 132, but is larger in diameter equal to that of the central bore 26 through the respective nozzle 10.

A groove 152 is machined in the lower surface 136 of the first body portion 132. The groove 152 extends from the second diagonal hole 148 to the first hole 146 and has two separate arms 154,156 which lead into opposite sides of the first hole 146. The arms 154,156 of the groove 152 are made with bends which are smoothly curved and have no sharp corners. A matching groove 158 having arms 160,162 is machined in the upper surface 138 of the second body portion 134. The first and second body portions 132,134 are assembled with the holes and grooves in alignment and are brazed together in a vacuum furnace. Brazing material which flows down through a duct (not shown) and along the interfaces between the parts by capiliary action and seals against leakage. It has been found that this method provides the second portion 126 of the melt duct 120 formed by the aligned grooves 152,158 with a smoothly finished surface which does not create turbulence in the melt flow. While this method produces a very good quality bushing, in production it will be more economical to make it by investment casting with the fine finish in the melt duct being provided by polishing with a liquid slurry which is pumped back and forth.

In use, the system is assembled as shown in FIG. 1 and described above. Electrical power is applied to heat the sprue bushing 96, manifold 44 and the nozzle 10 to a predetermined operating temperature. Pressurized melt is then introduced into the melt passage 98 by a molding machine (not shown) positioned at the mouth 94 of the sprue bushing 96. Melt pressure is controlled according to a predetermined cycle in conjunction with the application of controlled hydraulic pressure through the ducts 90 to the actuating mechanism, in a conventional manner. With the valve pins 60 in the retracted open position, the melt flows through the gates 28 and fills the cavities 30. After the cavities are full, injection pressure is held momentarily to pack and hydraulic pressure is then applied to drive the piston 72 and valve pin 60 to the forward closed position with the tip end 68 of each valve pin 60 seated in one of the gates 28. The injection pressure is then released and this position is held for a short cooling period before the mold is opened for ejection. After ejection, the mold is closed and hydraulic pressure reapplied to draw the valve pin 60 to the retracted open position. Melt injection pressure is reapplied to refill the cavities, and the molding cycle is repeated continuously every few seconds depending on the size and shape of the cavities and the type of material being molding.

While the description of the valve pin bushing and method of making it has been given with respect to preferred embodiments, it is not to be construed in a limiting sense. Variations and modifications will occur to those skilled in the art. For example, the arms 128,130 of the melt duct 120 leading to the valve pin 60 can have alternate configurations. The first and second body portions 132,134 can have different shapes, and the order of the steps of manufacture can be varied. Reference is made to the appended claims for a definition of the invention.

What I claim is:

1. In a multi-cavity valve gated injection molding system comprising a manifold extending between a mold back plate and a plurality of spaced heated nozzles seated in a cavity plate, an elongated valve pin having a driven end and a tip end mounted in a central bore in each nozzle, the driven end of the valve pin being operatively connected to valve pin actuating mechanism mounted in the mold back plate whereby the valve pin is reciprocated between a retracted open position and a closed position wherein the tip end of the valve pin is seated in a gate extending through the cavity plate to a cavity, and a melt passage which branches from a common inlet and extends through the manifold connecting to the transverse bore and around the valve pin in the central bore of each nozzle to convey pressurized melt from a matching machine to each gate, the improvement wherein; the melt passage extends through a valve pin bushing having a main body portion located between the manifold and each heated nozzle, the main body portion of each bushing being fixed to the respective nozzle and having first and second opposed surfaces and an outer periphery, a portion of the first surface abutting against the manifold, at least a portion of the second surface abutting against the respective nozzle and a sufficient portion of the outer periphery abutting the surrounding cavity plate to laterally locate the bushing, the main body portion having a valve pin bore extending therethrough from the first surface to the second surface, the valve pin bore having a first portion extending from the first surface and a second aligned portion extending from the second surface to join the first portion, the first portion of the valve pin bore having a substantially uniform diameter to snugly receive the valve pin therethrough, the second portion of the valve pin bore having a larger diameter than the first portion and extending in alignment to connect to the central bore of the nozzle, the main body portion of the valve pin bushing having a melt duct which forms a portion of the melt passage, the melt duct extending from the first surface of the main body portion to a join between the first and second portions of the valve pin bore, the melt duct branching into two arms with bends which are smoothly curved to connect to the valve pin bore on opposite sides thereof.

2. An injection molding system as claimed in claim 1, wherein the melt duct has a first portion extending diagonally from the first surface of the main body portion and a second portion which branches into the two arms, the second portion extending substantially parallel to the first and second surfaces of the main body portion.

3. An injection molding system as claimed in claim 2 wherein the valve pin bushing has a collar portion which extends from the first surface of the main body portion into an opening in the manifold, the first portion of the valve pin bore extending through the collar portion, and sufficient clearance being provided between the collar portion and the manifold to allow for thermal expansion of the manifold.

* * * * *

UNITED STATES PATENT OFFICE
CERTIFICATE OF CORRECTION

Patent No. 4,705,473　　　　　Dated November 10, 1987

Inventor(s) HARALD HANS SCHMIDT

It is certified that error appears in the above-identified patent and that said Letters Patent are hereby corrected as shown below:

On the Title Page, Item [30] should read:

Foreign Application Priority Data:

October 23, 1986 - Canada - Serial No. 521,261.

Signed and Sealed this

Thirty-first Day of May, 1988

Attest:

DONALD J. QUIGG

Attesting Officer

Commissioner of Patents and Trademarks